L. F. Parker,
Grain Binder.

No. 110,492.  2 Sheets. Sheet 1.  Patented. Dec. 27, 1870.

Witnesses  
Norman Jordan

Inventor,  
La Fayette Parker

L. F. Parker,
Grain Binder.

No. 110,492

2 Sheets, Sheet: 2.

Patented. Dec. 27. 1870.

Witness:
Norman Jordan
Frank H. Merrill

Inventor
La Fayette Parker

UNITED STATES PATENT OFFICE.

LA FAYETTE PARKER, OF DAVENPORT, IOWA.

IMPROVEMENT IN GRAIN-BINDERS.

Specification forming part of Letters Patent No. 110,492, dated December 27, 1870.

*To all whom it may concern:*

Be it known that I, L. F. PARKER, of the city of Davenport, in the county of Scott and State of Iowa, have invented new and useful Improvements to a Machine for Binding Grain, which I have heretofore invented, and on which I have received Letters Patent No. 94,436, dated August 31, 1869; and I do hereby declare that the following is a full, clear, and exact description of said improvements, reference being had to the accompanying drawings, making part of this specification, and to the letters of reference marked thereon, like letters indicating like parts wherever they occur.

To enable others skilled in the art to construct and use my invention, I will proceed to describe it.

Figure 1:
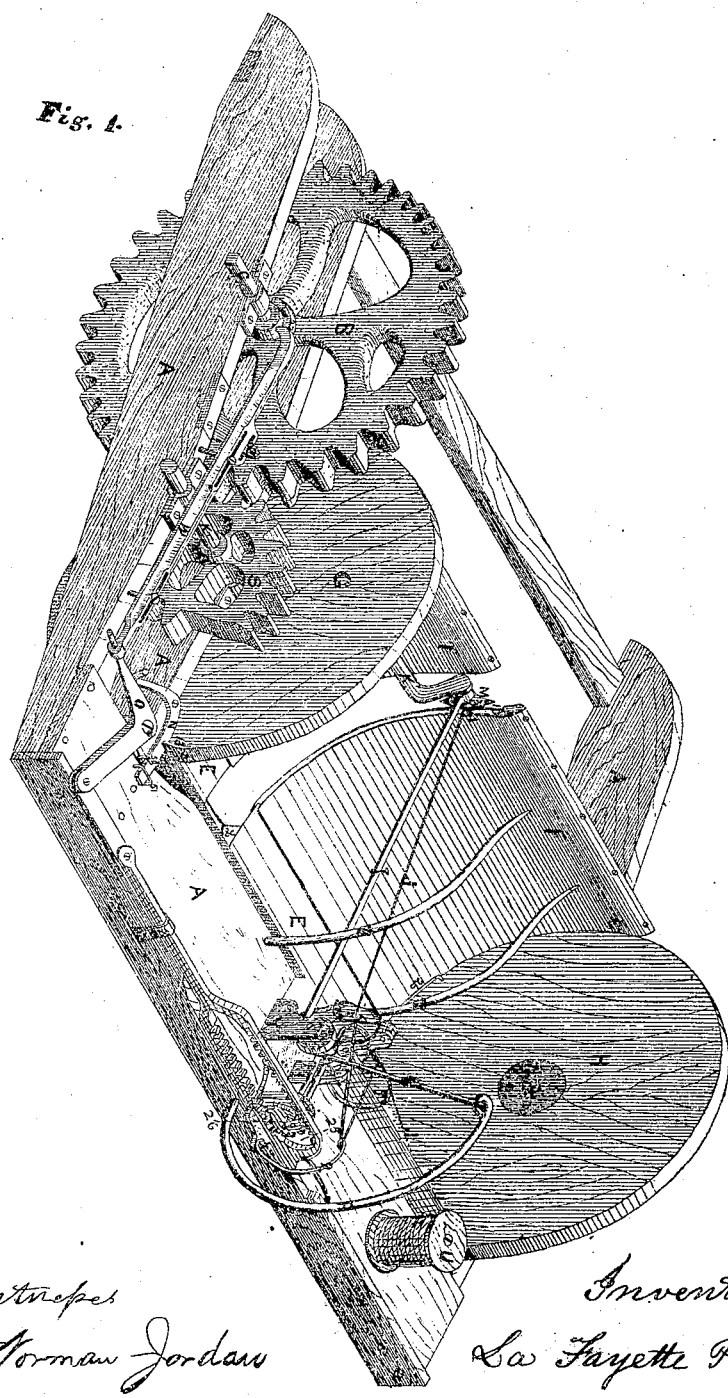
Figure 3:
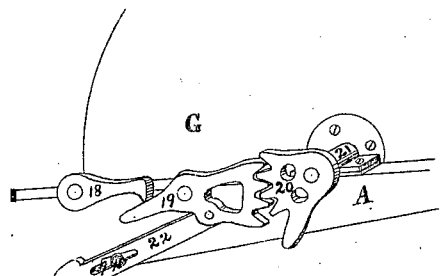
Figure 2:
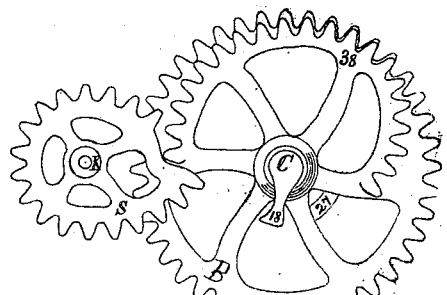

Figure 1 is a perspective view of my invention. Figs. 2 to 12 inclusive are detached views of the several parts.

Figure 4:
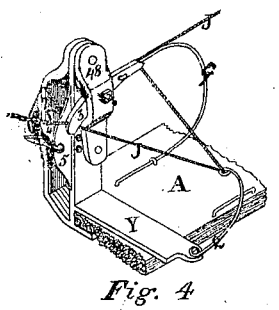
Figure 5:
Figure 6:
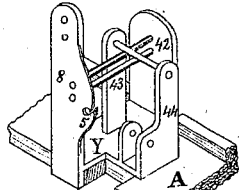
Figure 7:
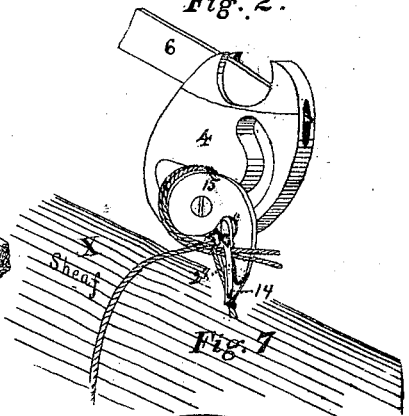
Figure 9:
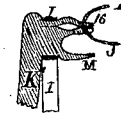
Figure 8:
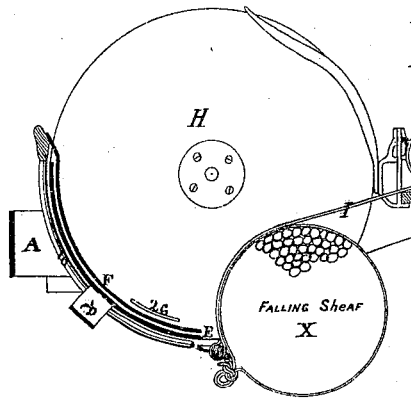
Figure 10:
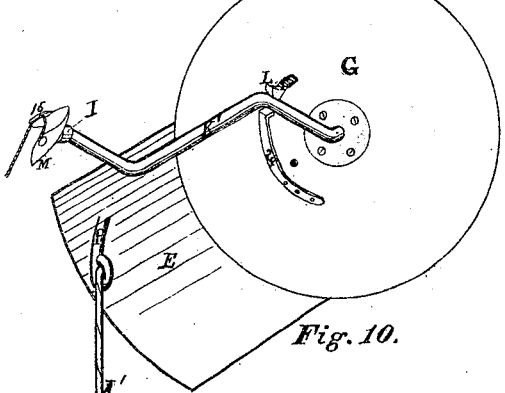
Figure 11:
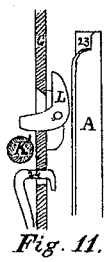
Figure 12:
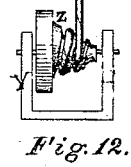

In constructing my improved machine I make a frame, as shown at A, or vary it to suit desired size and length of gavel, and the particular location on the reaper to which it is attached. The binding apparatus is driven by means of sectional gear 38 and cams 18 and 27, on spur-wheel B, which receives its motion from any convenient part of the harvesting-machine that will cause it to make one complete revolution to each gavel bound. Sectional gear 38 and irregular spur-wheel S actuate arm K', causing it to make a little more than a revolution. The irregular shape is given to increase the power, and to enable spur-wheel S to be more readily taken up by the line of cogs in motion. Spur-wheel S may be of any size, but the line of cogs 38 must correspond in number and size relative to the size of spur-wheel B, which will regulate the proportion of time given to binding and ejecting the sheaf. F F and E E comprise the grain-receiving concave. Parts F F are stationary to the frame. Parts E E are attached to the cylinder-heads G and H, and vibrate with them. They are also connected together by strap *a*. K' is the extension of shaft K, which revolves with the irregular spur-wheel S, and passes through the cylinder-head G. Arm K' bends at right angles to its shaft, and parallel to face of cylinder-head far enough to act on spring 24 and rock-stop L, then again turns out from cylinder-head and bends down and forward until its end reaches to and below the concave in its opening in the middle, as shown in Figs. 1 and 10. This arm is designed to carry the compressing strap and twine around the grain. Its shape is given to keep it from interfering with the loose gavel or bound sheaf when being ejected. 16 is a spring on end of the arm to take up the twine. M is a divider, so constructed as to pass through any straw that may be in its way when the arm is in motion, and also to protect the knot-tier from loose grain, and to receive in opening 41 the twine between sheaf and knot-tier, and to draw it into knot. 41 is an opening in divider M, into which both ends of the twine naturally come before the knot is tied, serving, as the arm falls after the twine is cut, to draw it from the looper into a knot. T and 7 are standards to hold the gavel in place while being pressed. 21 is hollow shaft to the cylinder-head G. 18, cam; 19, cog-lever; 20, segment; 22, slide; 39, slot; and 40, bolt, are devices for causing cylinder-head receiver E E and arm K' to vibrate to discharge the sheaf. 18 is attached to shaft C and spur-wheel B; 20, to hollow rolling-shaft 21. (See Fig. 3.) Z, I, I', and P, are devices for compressing gavel. Strap I is attached to arm K', pulley Z to standard Y, strap I' to pulley Z and spring P, and spring P to the frame. Pulley Z has tapering groove on end, drawing strap from spring P. 24 and L are spring and stop on cylinder-head G to hold arm k' to place at certain times and cause it to oscilate with cylinder-head and concave. Y is a standard, carrying the knot-tier and pulley Z, so constructed as to be easily removed from the frame to which it is bolted. (See Fig. 6.) 7 is a guard over knot-tier, having a rest for the stationary cutter 6 and standard T, also point 52, to hold the twine in place. (See Fig. 5.) 2 is a device for taking up the slack in the twine when too much is drawn out by arm K'. It is operated by sliding rack V. U is a spool for twine, located on an upright shaft to give tension to the twine. 13 is a dog, resting on stop N to hold part E E of the combined receiver and discharger in place at certain times. 5 is a catch, under which the twine is carried by circle 4, retaining to be taken up by spring on arm K', and also what may be needed to draw into the next knot. This is so constructed that the end of the twine brought up by pinchers or spring 16 shall pass over and not into the opening of catch 5. 3 is a pivoted twine-holder, the twine passing through both ends of it. It is movable, spring 9 holding it in position, as seen in Fig. 4, except when raised by arm K', so that the twine shall rest between the points on circle 4. The end from which the twine is drawn is wedge-shaped, so that the spring and end of the arm pass on opposite sides of it, and catch the twine as they leave the twine-holder. 15 is a claw on the outer face of the looper 14, and is attached loosely to the same. Its function is, in conjunction with spring 28, to hold the twine while being drawn into a knot.

The machine may be modified by locating dog 13 so as to be caught by spring-stop N, operated by cam 18, just before it strikes lever 19; also by a slide attached to the end of sliding rack V next the spool, to be moved by the sliding rack, so as to impede the drawing of the twine from the spool while slack is being taken up by rod 2. There may also be a screw in the frame back of the slide, to regulate the amount of pressure on the spool also. Stop 17 may be left off.

The parts of the binder not herein described are used for the purposes and as described in application for Patent No. 94,436, issued August 31, 1869.

The general manner of operating my invention is as follows: When the grain is brought into the receiver the spur-wheel B, being put in motion by the movement of the reaper to which it is attached, or otherwise, binds a gavel to each of its revolutions by acting upon the machinery described as follows: It causes the arm, by means of sectional gear 38 and spur-wheel S, to revolve around the gavel, carrying the compressing-strap and twine. The gavel is compressed by the strap being wound on pulley Z through the action of spring P. The twine is taken up and held by springs 16 on arm K', and drawn through the holder from the spool. When the arm has reached the opposite side of the receiver, cam 27 on spur-wheel B, acting upon sliding bar W, bell-crank lever O, and sliding rack upon the knot-tying apparatus, carries the looper and circle to position to commence tying the knot, and in doing so the circle 4 carries the twine resting between its points, as shown in Fig. 1, down, by the hook on the looper, below the point 52 on standard 7 and into catch 5.

Just about the time arm K' falls onto spring 24, and about the time sectional gear 38 leaves spur-wheel S, cam 27, by its outer shoulder, strikes rock-lever 2, which, acting upon sliding bar W and its connections, moves the circle 4 and looper 14, and ties the knot, as described in patent 94,436, except that the ends of the twine are held under spring 28 of looper 14 by claw 15, and catch 5 holds one end of the twine under it and permits the other to pass over it, and hook 52 holds the upper twine down so that it passes into opening 41. Any slack or excess of twine drawn from the spool by the arm is taken up by rod 2, moved by sliding rack V. As the knot is tied and twine cut off bell-crank lever o moves stop N from under dog 13, and parts E E of the receiver with arm K' fall back by their own weight and action of the spring on the strap around gavel, leaving an opening below for discharging the bound grain out of the receiver. This opening of the bottom for the discharge of the grain is not dependent alone on this action, but it is forced open by means of cam 18, acting upon lever 19, segment 20, hollow rolling-shaft 21, of the cylinder-head, causing it with its attachments to make part of a revolution, thus sliding part of the receiver out of the way, and carrying arm K' with it, by means of rock-stop L. The bottom E E and arm K' remain stationary in this position for a little time, to allow the bound grain to get fairly out of the way; then cam 18 leaves lever 19 and strikes the shoulder of slide 22, and moving this slide causes the lever to return cylinder-head G and its connections back to the first position, or far enough to bring spur-wheel S to position to be taken up by sectional-gear 38. Slide 22 falls out of the way of cam 18 by a widening in slot 39 having reached supporting-bolt 40. The action of the spring upon the arm would, in most cases, bring the spur-wheel to a proper position to be actuated, but slide 22 guards against accidents.

Having thus described my invention, what I claim as new, and desire to secure by Letters Patent, is—

1. The combined grain receiver and discharger F F and E E, constructed and operating substantially as described.

2. In combination with the preceding, the arm K', constructed and operating as described.

3. The combination of the sectional gear 38 and irregular spur-wheel S, constructed as described, to impart an intermittent and irregular motion to arm K', as set forth.

4. The combination, of the cam 18, cog-lever 19, sectional gear 20, and hollow rolling-shaft 21, with the combined receiver and discharger, to cause it to open and discharge the bound sheaf, as shown.

5. In combination with the preceding, the slide 22, for the uses and purposes as described.

6. The combination of the compressing devices consisting of the pulley Z, strap I, and strap I' and spring P, constructed and operating as described.

7. The combination of spring-stop 24, and rock-stop L, with the cylinder-head G, and arm K', as shown and described, for the purposes specified.

8. The vibrating twine-holder 3, in combination with spring 9, for the purposes shown and described.

9. The combination of the rod 2, twine-holder 3, and sliding rack V, as shown and described, for purposes specified.

10. The twine-catch 5, constructed and operating as described, in combination with the circle 4, as and for the purposes specified.

11. The combined divider and guard M, constructed and operating as shown and described.

12. The combination of dog 13, stop N, bell-crank O, and cylinder-head G, arranged and operating as and for the purposes described.

LA FAYETTE PARKER.

Witnesses:
H. PRICE,
JAMES THORINGTON.